United States Patent
Rapsinski et al.

(10) Patent No.: US 6,606,227 B2
(45) Date of Patent: Aug. 12, 2003

(54) HIGH VOLTAGE BATTERY CUTOUT CIRCUIT FOR A MOTOR VEHICLE ELECTRICAL SYSTEM

(75) Inventors: Robert E. Rapsinski, Kokomo, IN (US); Alexander C. Lawhon, Kokomo, IN (US); Desmond Ang, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 187 days.

(21) Appl. No.: 09/780,711

(22) Filed: Feb. 12, 2001

(65) Prior Publication Data

US 2002/0109952 A1 Aug. 15, 2002

(51) Int. Cl.[7] .............................. H02H 3/18; H02H 7/06
(52) U.S. Cl. .............................. 361/86; 361/18; 361/20; 361/91.1; 307/9.1; 307/10.2; 307/10.6
(58) Field of Search ..................... 361/18, 56, 91.1, 361/86, 20, 21; 307/9.1, 10.2, 10.6, 23, 46, 48, 64–66, 72

(56) References Cited

U.S. PATENT DOCUMENTS 3,789,269 A * 1/1974 Holm et al. .................. 361/18
6,222,341 B1 * 4/2001 Dougherty et al. ......... 320/104

* cited by examiner

*Primary Examiner*—Kim Huynh
(74) *Attorney, Agent, or Firm*—Jimmy L. Funke; Stefan V. Chmielewski

(57) ABSTRACT

An improved over-voltage protection circuit for a motor vehicle electrical system includes an over-voltage responsive circuit for momentarily disconnecting the vehicle storage battery and alternator from vehicle electrical loads, and an auxiliary storage battery for supplying a safe operating voltage to the electrical loads during the momentary disconnection. The over-voltage responsive circuit includes a MOSFET device that couples the vehicle storage battery and alternator to the electrical loads and auxiliary storage battery, and a voltage responsive circuit that turns the MOSFET device off to decouple the electrical loads and auxiliary storage battery from the vehicle storage battery and alternator so long as an over-voltage condition is detected.

8 Claims, 1 Drawing Sheet

US 6,606,227 B2

HIGH VOLTAGE BATTERY CUTOUT CIRCUIT FOR A MOTOR VEHICLE ELECTRICAL SYSTEM

TECHNICAL FIELD

This invention relates to a motor vehicle electrical system, and more particularly to a high voltage protection circuit that isolates an electrical load from damage and/or power interruption during over-voltage conditions.

BACKGROUND OF THE INVENTION

It is well known that motor vehicle electrical systems are subject to over-voltage under a number of different conditions. For example, jump-starting the engine with an excessive supply voltage subjects the electrical loads to the excessive voltage as well. Also, the ignition voltage is subject to transient surges during so-called load dump events when the vehicle storage battery is momentarily or permanently disconnected from an engine-driven alternator. In such case, the alternator output voltage can rise well above the nominal charging voltage before the voltage regulator can remove the alternator field winding excitation. For this reason, many load devices are provided with over-voltage protection circuits that either block high voltages or shut down when the supply voltage rises above an over-voltage threshold. This is obviously an undesirable condition since it adds to the cost of the individual load devices, and in the case of a shut-down, renders the load device inoperative until a reset occurs. Accordingly, what is needed is an over-voltage protection apparatus that protects electrical load devices from damage and/or power interruption during both improper jump-starting and load dump conditions.

SUMMARY OF THE PRESENT INVENTION

The present invention is directed to an improved over-voltage protection circuit for a motor vehicle electrical system, including an over-voltage responsive circuit for momentarily disconnecting the vehicle storage battery and alternator from vehicle electrical loads, and an auxiliary storable battery for supplying a safe operating voltage to the electrical loads during the momentary disconnection. The over-voltage responsive circuit includes a MOSFET device that couples the vehicle storage battery and alternator to the electrical loads and auxiliary storage battery, and a voltage responsive circuit that turns the MOSFET device off to decouple the electrical loads and auxiliary storable battery from the vehicle storable battery and alternator so long as an over-voltage condition is detected.

DESCRIPTION OF THE PREFERRED EMBODIMENT

Figure 1:
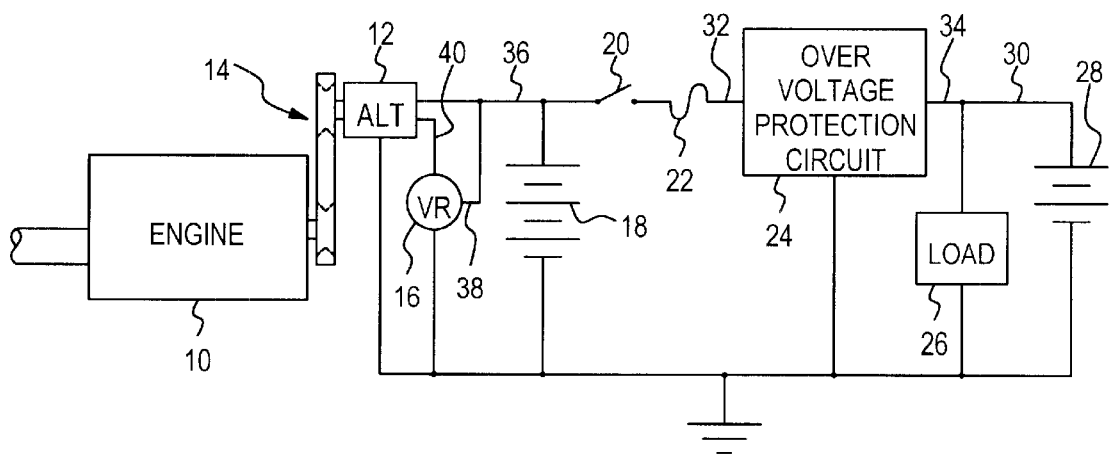
FIG. 1 is a circuit diagram of a motor vehicle electrical system including an auxiliary storage battery and over-voltage protection circuit according to this invention.

Referring to FIG. 1, the reference numeral 10 generally designates a motor vehicle electrical system according to this invention, including an engine 10, an alternator 12 rotatably driven by engine 10 via a belt and pulley arrangement 14, a voltage regulator 16, a storage battery 18, an ignition switch 20, a fuse 22, an over-voltage protection circuit 24, an electrical load 26 and an auxiliary storage battery 28. A common ground connection is provided for the alternator 12, voltage regulator 16, storage battery 18, over-voltage protection circuit 24, electrical load 26 and auxiliary storage battery 28, as shown. The auxiliary storage battery 28 is directly coupled to the electrical load 26 via line 30, while the main storage battery 18 is coupled to the load 26 via ignition switch 20, fuse 22 and over-voltage protection circuit 24 via lines 32, 34. The output terminal of alternator 12 is connected to the main storage battery 18 via line 36, and the voltage responsive input of voltage regulator 16 is coupled to line 36 via line 38. The voltage regulator 16 compares the sensed voltage to an internal reference voltage, and supplies current to a field winding (not shown) of alternator 12 for maintaining the voltage on line 36 substantially equal to the reference voltage. A driver manipulated ignition key closes the ignition switch 20 so that during engine operation, the alternator 12 supplies charging current to both main and auxiliary storage batteries 18 and 28, as well as to the electrical load 26.

The potential for over-voltages on line 36 occurs for at least two different reasons: excessive jump-start voltage, and load dump events. Excessive jump-start voltage usually occurs when a 24-volt source is used to jump-start a vehicle having a 12-volt electrical system, since both 12-volt and 24-volt electrical systems are utilized in production vehicles. For example, if a 24-volt source is connected in parallel with main storage battery 18, line 32 jumps to 24-volts as soon as ignition switch 20 is closed. If the line 34 also jumped to 24-volts, the load 26 could be damaged if not adequately protected, or subject to automatic over-voltage shut-down. Load dump events, on the other hand, occur during engine operation when the storage battery 18 is momentarily or permanently disconnected from line 36. This can occur due to a loose battery cable or an intermittent internal battery connection, or due to physical intrusion in a vehicle collision, for example. In this case, the alternator output voltage on line 36 can rise well above the regulator reference voltage before voltage regulator 16 can scale back the alternator field winding excitation. As with the case of excessive jump-start voltage, transient over-voltage due to load dump events is potentially damaging to the electrical load 26, and may trigger an automatic over-voltage shut-down, resulting in loss of function. This is especially problematic when the electrical load 26 is a safety or emergency device that functions to trigger an emergency signal or communication in the event of a detected crash event, since the crash event may involve disconnection of the storage battery 18 from alternator 12.

Figure 2:
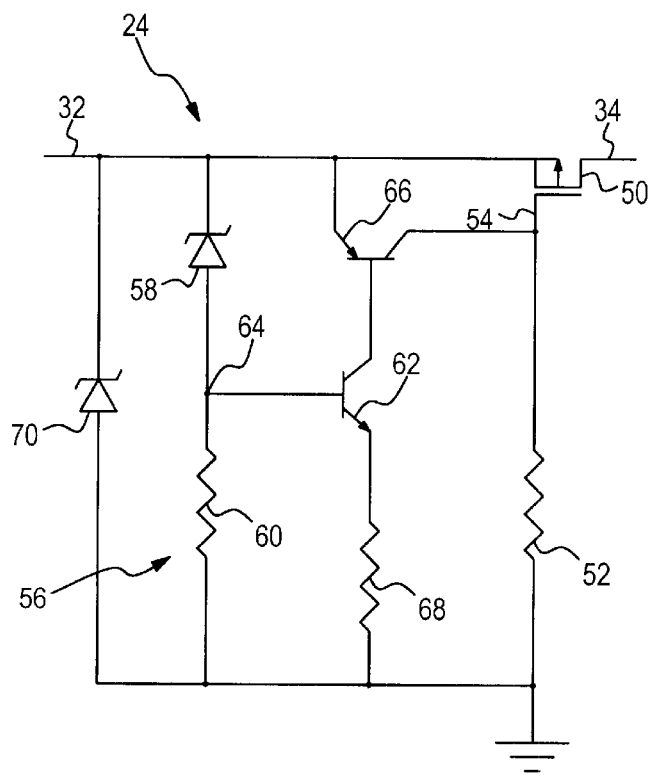
FIG. 2 is a circuit diagram of the over-voltage protection circuit of FIG. 1.

The over-voltage protection circuit 24, shown in detail in FIG. 2, operates in the event of a specified over-voltage on line 32 to effectively decouple lines 32 and 34, isolating the load 26 and auxiliary storage battery 28 from the alternator 12 and main storage battery 18. In such event, the auxiliary battery 28 provides power to load 26 via line 30, and the load 26 is protected from over-voltage damage, and loss of function due to automatic shut-down is prevented. Referring to FIG. 2, the over-voltage protection circuit 24 includes a P-channel MOSFET 50 coupling line 32 to line 34 through its source-to-drain circuit, a pull-down resistor 52 connected between the MOSFET (ate terminal 54 and ground for normally biasing the MOSFET 50 to a conductive state, and a voltage responsive circuit 56 for biasing MOSFET 50 to a non-conductive state when the voltage with respect to ground on line 32 exceeds a predefined threshold. The voltage responsive circuit 56 includes a zener diode 58 and resistor 60 coupled in series between line 32 and ground potential, a NPN transistor 62 having its base coupled to a junction 64 between zener diode 58 and resistor 60, and a PNP transistor 66 having its emitter-collector circuit coupled across the gate-to-source circuit of MOSFET 50. The zener diode 58 is ordinarily reverse biased, and the resistor 60 maintains the transistors 62 and 66 in non-conductive states. However, when the voltage on line 32 exceeds the breakdown voltage of zener diode 58 (which may be 18 volts, for example), a current path is established through the resistor 60, and the resulting voltage at junction 64 biases transistor 62 to a conductive state. This establishes a current path through the emitter-base circuit of transistor 66, the collector-emitter circuit of transistor 62 and resistor 68, biasing transistor 66 conductive to place a low impedance path between the gate and source terminals of MOSFET 50 to bias MOSFET 50 to a non-conductive state. Finally, the over-voltage protection circuit 24 also includes a second zener diode 70 connected between line 32 and ground potential for limiting the peak voltage applied to the aforementioned circuit elements, and for establishing a low impedance path through fuse 22 and battery 18 in the event that a reverse polarity is applied to battery 18 during jump starting; for example, zener diode 70 may have a breakdown voltage of approximately 35-volts.

In normal operation, the alternator 12 and/or battery 18 supply power to the electrical load 26 (and charging current to auxiliary battery 28) via the source-to-drain circuit of MOSFET 50, and the transistors 62 and 66 of over-voltage protection circuit 24 are biased off. If it becomes necessary to jump-start the engine 10, and the battery cables are inadvertently reversed, a short-circuit current flows through the diode 70, blowing the fuse 22 to protect the electrical system 10. If the cables are properly routed, but the voltage of the jumping battery is too high (24-volts, for example), the resulting reverse current through zener diode 58 will bias transistors 62 and 66 on as explained above, quickly biasing MOSFET 50 off to isolate the load 26 and auxiliary battery 28 from line 32. In this case, the load 28 never sees a voltage higher than the breakdown voltage of zener diode 58 (which may be 18-volts, as mentioned above), and power is continuously supplied to load 26 by virtue of the auxiliary battery 28. As soon as the jumping voltage is removed, the over-voltage protection circuit 24 reverts to its normal state, with the MOSFET 50 coupling line 32 to line 34. A similar effect is achieved if the engine 10 is running and a load dump event occurs; that is, the voltage responsive circuit 56 biases MOSFET nonconductive when the voltage with respect to ground on line 32 exceeds the breakdown voltage of zener diode 58, to isolate the load 26 and auxiliary battery 28 from line 32. Additionally, zener diode 70 conducts when the load dump voltage exceeds its breakdown voltage (which may be 35-volts, as mentioned above) to limit the voltage applied to MOSFET 50 and other circuit elements of over-voltage protection circuit 24. In no event is the load 26 exposed to a source voltage in excess of the breakdown voltage of zener diode 58; as a result, the load 26 is protected from damage due to over-voltage, and experiences no loss of function due to automatic over-voltage shut-down.

In summary, the over-voltage protection apparatus of the present invention provides a simple and effective expedient for protecting electrical load devices from damage due to over-voltage and for ensuring continuous functionality of the load devices during over-voltage conditions. While described in reference to the illustrated embodiment, it is expected that various modifications in addition to those mentioned above will occur to persons skilled in the art. For this reason, it should be understood that protection circuits incorporating such modifications may fall within the scope of this invention, which is defined by the appended claims.

What is claimed is:

1. Protection apparatus for a vehicle electrical load normally powered by an electrical system including a storage battery and an engine driven alternator for supplying charging current to said storage battery, comprising:
    an auxiliary battery connected in parallel with said electrical load;
    a normally conductive switching device coupling said alternator and storage battery to said electrical load and auxiliary battery;
    a voltage sensitive circuit coupled to the alternator and storage battery for detecting a voltage in excess of a threshold voltage; and
    a transistor circuit activated by said voltage sensitive circuit when the detected voltage exceeds said threshold voltage to bias said normally conductive switching device to a non-conductive state to isolate said alternator and storage battery from said electrical load and auxiliary battery, thereby to protect said electrical load from alternator voltages in excess of said threshold voltage while maintaining power supply to said electrical load via said auxiliary battery.

2. The protection apparatus of claim 1, wherein said transistor circuit returns said normally conductive switching device to a conductive state when the detected voltage falls below said threshold voltage.

3. The protection apparatus of claim 1, wherein said electrical load is an emergency device for communicating an emergency signal in response to a detected vehicle crash event.

4. Protection apparatus for a vehicle electrical load normally powered by an electrical system including a storage battery and an engine driven alternator for supplying charging current to said storage battery, comprising:
    an auxiliary battery connected in parallel with said electrical load;
    a normally conductive MOSFET having a source-to-drain circuit coupling said alternator and storage battery to said electrical load and auxiliary battery;
    a voltage sensitive circuit coupled to the alternator and storage battery for detecting a voltage in excess of a threshold voltage; and
    a transistor circuit including a first transistor having an emitter-collector circuit coupled across a source-to-gate circuit of said MOSFET, said first transistor being activated by said voltage sensitive circuit when the detected voltage exceeds said threshold voltage to bias said normally conductive MOSFET to a non-conductive state to isolate said alternator and storage battery from said electrical load and auxiliary battery, thereby to protect said electrical load from alternator voltages in excess of said threshold voltage while maintaining power supply to said electrical load via said auxiliary battery.

5. The protection apparatus of claim 4, wherein:
    said voltage sensitive circuit includes a zener diode having a breakdown voltage corresponding to said threshold voltage, and
    said transistor circuit includes a second transistor coupled to said first transistor and said second zener diode for biasing said first transistor to a conductive state when said detected voltage exceeds said breakdown voltage.

6. Protection apparatus for a vehicle electrical load normally powered by an electrical system including a storage battery and an engine driven alternator for supplying charging current to said storage battery, comprising:
- an auxiliary battery connected in parallel with said electrical load;
- a normally on MOSFET having source-to-drain circuit coupling said alternator and storage battery to said electrical load and auxiliary battery;
- a first transistor having an emitter-collector circuit coupled across a source-to-gate circuit of said MOSFET;
- a first zener diode and resistor connected in series across said storage battery; and
- a second transistor coupled to said first transistor and to a junction between said first zener diode and said resistor so as to bias said first transistor to a conductive state to turn off said MOSFET when a voltage across said storage battery exceeds a breakdown voltage of said first zener diode.

7. The protection apparatus of claim 6, further comprising:
- a fuse connected between said storage battery and said MOSFET; and
- a second zener diode having a breakdown voltage that is higher than the breakdown voltage of said first zener diode and connected across said storage battery and fuse so as to conduct in a forward direction and blow said fuse if a reverse voltage is placed in parallel with said storage battery, and so as to conduct in a reverse direction to protect said MOSFET if a voltage across said storage battery and fuse exceeds the breakdown voltage of said second zener diode.

8. The protection apparatus of claim 6, wherein said electrical load is an emergency device for communicating an emergency signal in response to a detected vehicle crash event.

* * * * *